(12) United States Patent
Kusuura (10) Patent No.: US 8,282,994 B2
(45) Date of Patent: Oct. 9, 2012

(54) CAN COATINGS

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 392 days.

(21) Appl. No.: 12/691,462

(22) Filed: Jan. 21, 2010

(65) Prior Publication Data

US 2011/0174828 A1 Jul. 21, 2011

(51) Int. Cl.
  B05D 3/12 (2006.01)
  B32B 3/30 (2006.01)
(52) U.S. Cl. ........................................ 427/274; 428/152
(58) Field of Classification Search ........................ None
  See application file for complete search history.

(56) References Cited

U.S. PATENT DOCUMENTS

| | | | |
|---|---|---|---|
| 4,020,034 A | 4/1977 | Freiter | |
| 4,179,418 A | 12/1979 | Waddill | |
| 4,554,342 A | 11/1985 | Corley | |
| 5,013,589 A | 5/1991 | Schafer et al. | |
| 5,094,924 A | 3/1992 | Matsui et al. | |
| 5,789,042 A | 8/1998 | Jester et al. | |
| 5,885,668 A | 3/1999 | Culbertson et al. | |
| 6,214,433 B1 * | 4/2001 | Tronche et al. | 428/64.1 |
| 6,576,343 B2 | 6/2003 | Parekh et al. | |
| 7,416,758 B2 | 8/2008 | Park et al. | |
| 2004/0167302 A1 * | 8/2004 | Obori | 526/209 |
| 2009/0046362 A1 | 2/2009 | Guo et al. | |
| 2009/0097215 A1 | 4/2009 | Hiew et al. | |

FOREIGN PATENT DOCUMENTS

| | | |
|---|---|---|
| EP | 1792 933 A1 | 6/2007 |
| JP | 09-038966 | 2/1997 |
| JP | 2007-203576 | 8/2007 |
| JP | 2008-73949 A * | 4/2008 |
| WO | WO 2007/046302 | 4/2007 |

OTHER PUBLICATIONS

International Search Report and Written Opinion for PCT/US2010/039570 mailed Aug. 6, 2010.
Kawamura, Y. et al., "Migration of Bisphenol A From Polycarbonate Products," *Journal of the Food Hygienic Society of Japan*, Jun. 1998, vol. 39, No. 3, pp. 206-212.
Su, W. F. A. et al., "Comparison of Cure Conditions for Rigid Rod Epoxy and Bisphenol A Epoxy Using Thermomechanical Analysis," *Journal of Applied Polymer Science*, vol. 70 (1998), pp. 2163-2167; published by John Wiley & Sons, Inc.
Aoki, K. et al., "UV-Curing of a Novolak Epoxy Resin Enhanced by a Multifunctional Base-amplifier," *Journal of Photopolymer Science and Technology*, vol. 19, No. 6 (2006), pp. 683-684.
Lee, H.-J. et al., "Effect of initial resist thickness on residual layer thickness of nanoimprinted structures," *J. Vac. Sci. Technol. B*, vol. 23, No. 6, Nov./Dec. 2005, pp. 3023-3027; published by American Vacuum Society.
Ahn, S. H. et al., "Bilayer metal wire-grid polarizer fabricated by roll-to-roll nanoimprint lithography on flexible plastic substrate," *J. Vac. Sci. Technol. B*, vol. 25, No. 6, Nov./Dec. 2007, pp. 2388-2391; published by American Vacuum Society.
Ahn, S. H. et al., "High-Speed Roll-to-Roll Nanoimprint Lithography on Flexible Plastic Substrates," *Adv. Mater.*, vol. 20, 2008, pp. 2044-2049; published by Wiley-VCH Verlag GmbH & Co.
Chou, S. Y. et al., "Nanoimprint lithography," *J. Vac. Sci. Technol. B*, vol. 14, No. 6, Nov./Dec. 1996, pp. 4129-4133; published by American Vacuum Society.
Pandey, J. K. et al., "Bio-nano reinforcement of environmentally degradable polymer matrix by cellulose whiskers from grass," *Composites Part B: Engineering*, vol. 40, Issue 7, Oct. 2009, pp. 676-680; published by Elsevier Ltd.
"New Film Laminated Steel Sheet for 18L Can and Pail Can," *NKK Technical Review*, No. 86 (2002), pp. 44-45.
Kang, S. J. et al., "New film-forming aromatic poly(amide-imide)s containing isoindoloquinazolinedione unit in the backbone. 2. Physical properties of the film cast from poly(biphenylphthalicdianhydrideoxydianiline-4,4'-diamino-3'-carbamoyl-benzanilide) [poly(BPDA-ODA-DACB)]," *Journal of Applied Polymer Science*, vol. 78, Issue 1, Jul. 2000, pp. 118-123.
Iwatake, A. et al., "Cellulose nanofiber-reinforced polylactic acid," *Composites Science and Technology*, vol. 68, Issue 9, Jul. 2008, pp. 2103-2106; published by Elsevier Ltd.
Akalin, M. et al., "Effects of ultrasonic energy on the wash fastness of reactive dyes," *Ultrasonics*, vol. 42, Issues 1-9, Apr. 2004, pp. 161-164; published by Elsevier B.V.
Hancock, J., "Ultrasonic Cleaning," reprinted from *ASM Handbook*, vol. 5: Surface Engineering, 2009, 8 pages; published by Blue Wave Ultrasonics, Inc.; printed from the Web on Dec. 16, 2009 at http://www.bluewaveinc.com/repring.htm.
Shunichi, M. et al., "Variations of Biaxial Orientation of Polyester Film on Laminated Steel in the Laminating Process," *Tetsu- to-Hagane*, vol. 86, No. 3 (2000), pp. 171-175; published by National Institute of Informatics.
Duarte, L. T. et al., "Production and characterization of thermally sprayed polyethylene terephthalate coatings," *Surface and Coatings Technology*, vol. 182 (2004), pp. 261-267; published by Elsevier B.V.
"Laminated Steel Sheet (Hi-Pet)—Manufacturing Process," 2 pages; printed from the Web at http://www.toyokohan.co.jp/en/products/hi_pet/process.html on Dec. 16, 2009.

(Continued)

*Primary Examiner* — Robert Sellers
(74) *Attorney, Agent, or Firm* — Foley & Lardner LLP (57) ABSTRACT

A coating composition includes a base coating resin; and an overlay coating resin; where the base coating resin includes micro-impressions and planar areas, where the following expression is satisfied for the coating composition: $P*T_B > A*T_O$, where A is the area of the micro-impressions, P is the area of the planar areas; $T_B$ is the tensile strength of the base coating resin, and $T_O$ is the tensile strength of the overlay coating resin. In some cases, $T_B$, is greater than $T_O$. A process for preparing the coating compositions includes applying a base coating resin to a substrate, micro-impressioning a top surface of the base coating resin to provide a micro-impressioned top surface of the base coating including micro-impressions and non-impressioned planar areas, and applying an overlay coating resin to the micro-impressioned top surface of the base coating.

20 Claims, 6 Drawing Sheets

OTHER PUBLICATIONS

"Washing can remove much BPA from plastics," 3 pages; printed from the Web at http://www.cbc.ca/consumer/story/2008/04/17/bisphenol-bandiera.html on Dec. 16, 2009.

"Precision IRT—IR-Thermal Cure Oven," 2 pages; printed from the Web at http://www.scscoatings.com/parylene_equipment/irt_uv-cure-ovens.aspx on Dec. 16, 2009.

"A Step Towards High Throughput Continuous Nanoimprinting," 25 pages; printed from the Web at http://nextbigfuture.com/2009/09/step-towards-high-throughput-continuous.html on Dec. 16, 2009.

"Epoxy resin and," 2 pages; printed from the Web at http://translate.googleusercontent.com/translate_c?hl=en&sl=ja&u=http://www.jers.co.jp/epoxy/whatsepoxy.html on Dec. 16, 2009.

"PET coatings," 1 page; printed from the Web at http://www.ig-gesund.com/Main.aspx?ID=2dfa5b7d-c006-4fd8/a59d-21821d9279e on Dec. 16, 2009.

"Propaties [sic] of engineering plastics," 2 pages; printed from the Web at http://homepage1.nifty.com/seas/database/ep/pet.htm on Jan. 18, 2010.

Notification Concerning Transmittal of Copy of International Preliminary Report on Patentability (Chapter 1 of the Patent Cooperation Treaty) (PCT Rule 44bis.1(c)) and International Preliminary Report on Patentability, for Intl. Pat. Appln. No. PCT/US2010/039570, mailed Aug. 2, 2012, 6 pp.

* cited by examiner

CAN COATINGS

TECHNOLOGY

The present technology is related in general to polymer coatings for containers.

BACKGROUND

A major source of non-occupational human exposure to 2,2-bis(4-hydroxyphenyl)propane) (a/k/a bis-phenol A, or BPA) is from food can coatings. Interior can coatings, also known as lacquers or enamels, are applied to the interior of cans to prevent corrosion of the can and contamination of food with a metallic taste. As these coatings prevent oxidation of the can, the coatings should have good adhesion to the metal of the can, flow well over the metal surface so that there are no eyeholes or inclusions in the coating, and be durable enough to survive lengthy periods of exposure to often acidic food. The process of coating a can typically involves spraying one or two layers of a coating using an airless spray system (depending on the coating system). This coating is then thermally cured at an elevated temperature, e.g. about 210° C.

While there are several types of can coatings available, many have very limited application due to incompatibilities with food chemistries, or because of their prohibitively high cost. The choice of resin is typically based on cost and the type of product that is inside the can. The vast majority of food and beverage cans produced today are coated with BPA-based phenolic-epoxy resins. However, BPA has been shown to migrate from the coatings on these cans in small amounts into liquids and food products, thereby posing a potential health risk to humans that consume the food. Due to this, coatings with BPA are becoming disfavored, despite their other superior performance properties.

Suggested replacement coatings for BPA in various can applications, include polyethylene terephthalate (PET) resins. However, PET-based coating materials are subject to damage and peel-off during processing of the cans, due to the softness and low adhesiveness.

SUMMARY

In one aspect, a process of preparing a coated substrate includes micro-impressioning a top surface of a base coating resin to provide a micro-impressioned top surface of the base coating including micro-impressions and non-impressioned planar areas; and applying an overlay coating resin to the micro-impressioned top surface of the base coating. In some embodiments, the coated substrate adheres to the formula: $P*T_B > A*T_O$; where $T_B$, is a tensile strength of the base coating resin; $T_O$ is a tensile strength of the overlay coating resin; A is the area of the micro-impressions; and P is the area of the non-impressioned planar areas. In some embodiments, $T_B$ is greater than $T_O$.

In some embodiments, the process also includes contacting the micro-impressioned top surface of the base coating with a solvent prior to applying the overlay coating resin, to extract unreacted or excess materials of the base coating. In some such embodiments, the unreacted or excess materials include bis-phenol A.

In some embodiments, the process includes curing the base coating resin to form a cured based coating resin, wherein the micro-impressioning comprises boring holes into the top surface of the cured base coating resin. In other embodiments, the micro-impressioning comprises rolling or stamping micro-impressions into the top surface of the base coating resin. In yet other embodiments, the rolling micro-impressions comprises rolling a patterning device comprising micro-protrusions over the cured or curing base coating resin. In further embodiments, the stamping micro-impressions comprises applying a stamp comprising micro-protrusions to the cured or curing base coating resin.

In some embodiments, the substrate is plastic, metal, or glass. In other embodiments, the substrate is a metal blank for the formation of a can. In some other embodiments, the process includes forming the substrate into a can.

In another aspect, a coating composition includes a base coating resin including micro-impressions and planar areas; and an overlay coating resin; where: $P*T_B > A*T_O$; and where $T_B$, is a tensile strength of the base coating resin; $T_O$ is a tensile strength of the overlay coating resin; A is the area of the micro-impressions; and P is the area of the planar areas. In some embodiments, $T_B$ is greater than $T_O$.

In some embodiments, the base coating resin includes an epoxy resin. In some such embodiments, the epoxy is a two-component epoxy resin. In other such embodiments, the epoxy resin comprises bis-phenol A.

In some embodiments, the overlay coating resin is a polypropylene resin, a polyethylene resin, a polyethylene terephthalate resin, a polyurethane resin, or a blend of any two or more resins thereof, or a copolymer of any two or more such resins. In some such embodiments, the overlay coating resin is a polyethylene terephthalate resin, or a blend thereof. In further embodiments, the micro-impressions are filled with the overlay coating resin.

In some embodiments, the area of the micro-impressions is from about 0.001 $\mu M^2$ to about 1000 $\mu M^2$. In some other embodiments, $T_B$ is from about 50 MPa to about 100 MPa, from about 55 MPa to about 90 MPa, from about 60 MPa to about 85 MPa, from about 65 MPa to about 80 MPa, or from about 65 MPa to about 75 MPa. In some embodiments, $T_B$ is from about 65 MPa to about 75 MPa. In other embodiments, $T_O$ is from about 70 MPa to about 110 MPa, from about 75 MPa to about 105 MPa, from about 75 MPa to about 100 MPa, from about 80 MPa to about 95 MPa, or from about 80 MPa to about 90 MPa. In further embodiments, $T_O$ is from about 80 MPa to about 90 MPa.

In another aspect, a can includes a base coating layer comprising micro-impressions and planar areas; and an overlay coating resin. In some embodiments of the can, $P*T_B > A*T_O$ where $T_B$, is a tensile strength of the base coating resin; $T_O$ is a tensile strength of the overlay coating resin; A is the area of the micro-impressions; and P is the area of the planar areas. In other embodiments, $T_B$ is greater than $T_O$.

In some embodiments, the overlay coating resin is a polypropylene resin, a polyethylene resin, a polyethylene terephthalate resin, a polyurethane resin, or a blend of any two or more resins thereof, or a copolymer of any two or more such resins. In some such embodiments, the overlay coating resin is a polyethylene terephthalate resin, or a blend thereof. In further embodiments, the micro-impressions are filled with the overlay coating resin.

In some embodiments, the area of the micro-impressions is from about 0.001 $\mu M^2$ to about 1000 $\mu M^2$. In some other embodiments, $T_B$ is from about 50 MPa to about 100 MPa, from about 55 MPa to about 90 MPa, from about 60 MPa to about 85 MPa, from about 65 MPa to about 80 MPa, or from about 65 MPa to about 75 MPa. In some embodiments, $T_B$ is from about 65 MPa to about 75 MPa. In other embodiments, $T_O$ is from about 70 MPa to about 110 MPa, from about 75 MPa to about 105 MPa, from about 75 MPa to about 100 MPa, from about 80 MPa to about 95 MPa, or from about 80 MPa to about 90 MPa. In further embodiments, $T_O$ is from about 80 MPa to about 90 MPa.

DETAILED DESCRIPTION

The illustrative embodiments described in the detailed description and claims are not meant to be limiting. Other embodiments may be utilized, and other changes may be made, without departing from the spirit or scope of the subject matter presented here.

Two-layer coatings are provided in which a base coating layer, including an extractable amount of a toxic component, such as BPA, is overlaid with a second coating layer that is non-toxic. Such two-layer coatings may be useful in coating the interior of containers in which liquids or foodstuffs for ingestion are stored. The base coating layer includes micro-impressions that may provide higher surface area for extracting the toxic components prior to the application of the second coating layer, and/or may also provide additional adhesion of the second coating layer to the base coating layer. The materials used in the base coating and second coating layers are selected such that should the second coating layer delaminate from the base layer, the portions of the second coating layer contacting (i.e. plugging) the micro-impressions will tear from the second coating layer, thereby remaining as "plugs" in the micro-impressions of the base coating layer. By tearing to leave portions as plugs in the micro-impressions, the second coating layer, even upon de-lamination, provides some protection against further extraction of toxic components from the base coating layer and into the liquid or foodstuff Thus, in one aspect, a coating composition is provided. The coating compositions may be useful for coating a variety of substrates such as plastics, metals, glasses etc. The compositions provide for the use of a base coating resin, which adheres sufficiently to substrates, such that the base coating does not peel or lift from the substrate. However, such base coating resins tend to include chemicals capable of being extracted by a solution (i.e. a liquid or foodstuff) that is in contact with the coating resin. Therefore, an overlay coating is also provided, to partially or completely prevent such extraction from occurring.

The base coating resin may be, in some embodiments, an epoxy coating, as is known in the art. In some embodiments, the epoxy coating is a two-component epoxy coating. Such epoxy coatings provide good adhesion to substrates, such as metals, plastics, and glasses. In some embodiments, the epoxy coatings provide good adhesion to metal substrates. In some embodiments, the base coating composition, or epoxy coating, contains BPA. According to some embodiments, the epoxy resins are those conventionally used for can coatings.

The base coating material has a tensile strength, $T_B$. According to various embodiments, $T_B$ is from about 50 MPa to about 100 MPa, from about 55 MPa to about 90 MPa, from about 60 MPa to about 85 MPa, from about 65 MPa to about 80 MPa, or from about 65 MPa to about 75 MPa. In other embodiments, $T_B$ is from about 65 MPa to about 75 MPa.

The overlay coating resin may be, in some embodiments, a polypropylene, a polyethylene, a polyethylene terephthalate, or a polyurethane resin, or a mixture, blend, or copolymer of any two or more such materials. In some embodiments, the overlay coating resin is polyethylene terephthalate, or a blend or co-polymer thereof. In other embodiments, the overlay coating resin is polyethylene terephthalate. Such overlay coating resins, tend to be non-toxic and can provide a barrier layer over a more toxic, but adhesively more robust base coating resin.

The overlay coating material has a tensile strength, $T_o$. According to various embodiments, $T_o$ is from about 70 MPa to about 110 MPa, from about 75 MPa to about 105 MPa, from about 75 MPa to about 100 MPa, from about 80 MPa to about 95 MPa, or from about 80 MPa to about 90 MPa. In other embodiments, $T_o$ is from about 80 MPa to about 90 MPa.

The base coating resin is optionally patterned with micro-impressions. According to some embodiments, the micro-impressions provide additional surface area for the base coating resin such that toxic materials, such as BPA, may be more completely extracted (i.e. washed) from the base coating resin, prior to the application of the overlay coating resin. According to other embodiments, the micro-impressions provide additional surface area for which the overlay coating resin may be in contact with the base coating resin, thereby increasing the adhesion of the overlay coating resin to the base coating resin with the overlay coating filling, (i.e. "plugging" or "interdigitating") the micro-impressions of the base layer coating. Each of the micro-impressions in the base coating resin accounts for a surface area, A. As used herein, the surface area of each micro-impression is the area that would otherwise have been the surface area of the base coating layer. In some embodiments, the surface area of the micro-impressions is from about 0.0001 $\mu M^2$ to about 100 $\mu M^2$, from about 0.001 $\mu M^2$ to about 800 $\mu M^2$, from about 0.001 $\mu M^2$ to about 500 $\mu M^2$, from about 0.01 $\mu M^2$ to about $300_T A M^2$, or from about 0.01 $\mu M^2$ to about 100 $\mu M^2$.

In some embodiments, the micro-impressions are deep micro-impressions. As used herein, deep means that the length of the depth of the opening is longer than the length of the side (when the pore is square/rectangular etc), or diameter (when the pore is circle) of the opening. Optionally, the micro-impressions are provided in a discontinuous repetitive pattern in the surface of the base coating resin. Alternatively, the micro-impressions are randomly spaced in the surface of the base coating resin.

The base coating resin optionally has planar areas on the surface of the base coating layer in the non-impressioned areas,. Such planar areas have a surface area, P. As is evident from the relationship below, minimization of the planar surface area, P, is desirable according to some embodiments.

Figure 1A:
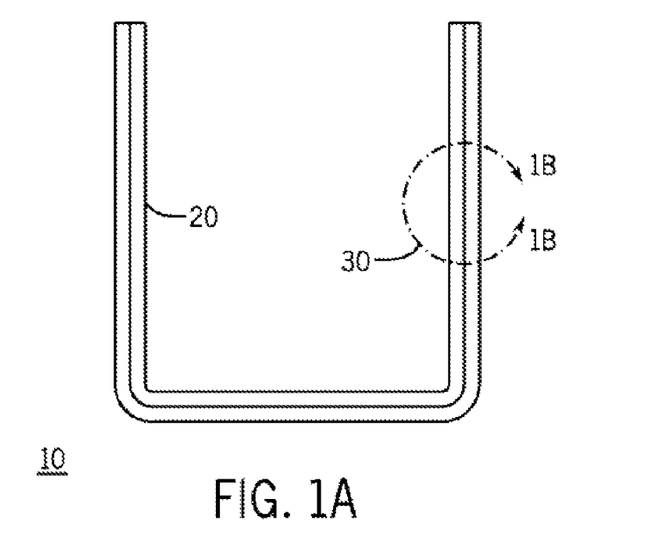
FIG. 1A is an illustration of a can coated having a micro-impression coating composition, according to one embodiment.
Figure 1B:
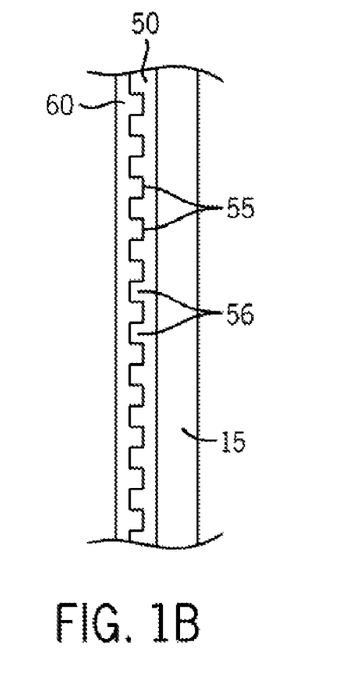
FIG. 1B is a detail of the portion of FIG. 1A noted as A.

FIG. 1 provides an illustration of a can 10 having a coating composition 20 that is present on the inner surface of the can. FIG. 1B is an illustration of the detail circled area 30 of FIG. 1A. As shown in FIG. 1B, the metal of the can 15, is coated with a base coating 50 having micro-impressions 55, in which an overlay coating 60 fills in the micro-impressions. Planar areas 56 are also illustrated.

Figure 2A:
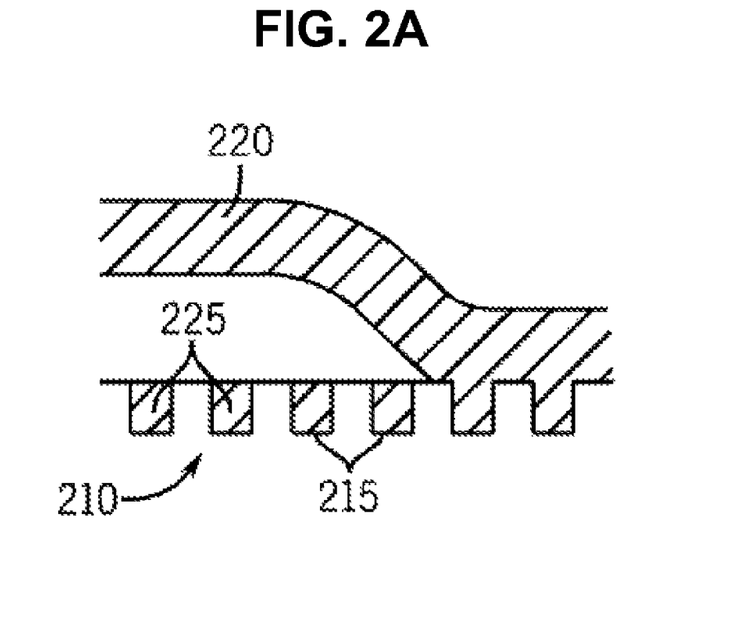
FIGS. 2A and 2B are illustrations of the design of micro-impressions in coating compositions, where the product of $P*T_B$ is greater than the product of $A*T_O$ (FIG. 2A), and where the product of $P*T_B$ is less than the product of $A*T_O$ (FIG. 2B).
Figure 2B:
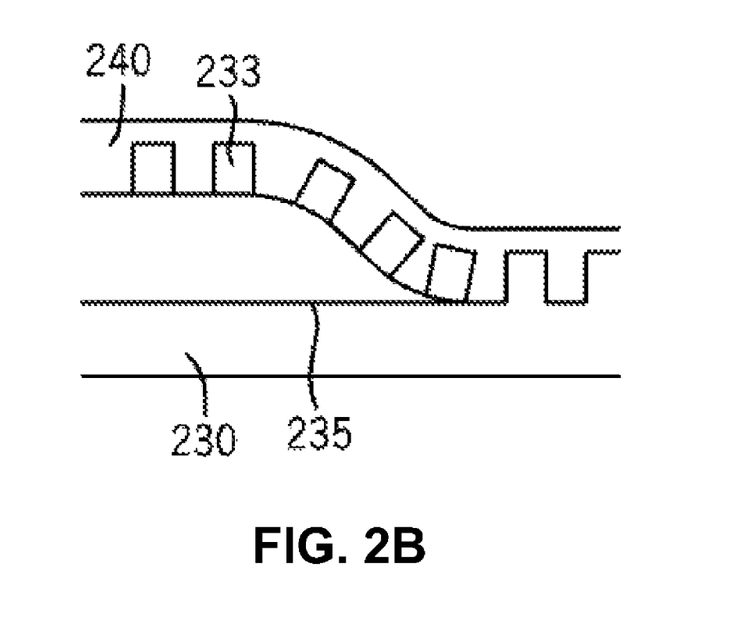

According to some embodiments, the tensile strength of the base coating resin, $T_B$, is greater than a tensile strength of the overlay coating resin, $T_O$. In other embodiments, following relationship applies: the product of P and $T_B$ is greater than the product of A and $T_O$. According to some embodiments, the micro-impressions are as large as possible while still adhering to this relationship. In other embodiments, minimization of P assists in maintaining the relationship for the coatings. By adhering to this relationship, peeling of the overlay coating from the base coating results in the portions of the overlay coating filling the micro-impressions severing from the overlay coating. The result is that the micro-impressions remain "plugged" by filler portions of the overlay coating, thereby continuing their protective effect, and shielding container contents from contact with the base layer and residual BPA that may otherwise leach from the base coating into the contents. The peeling may occur from application of an outside force, or stresses within the resin coatings. Such relationships are presented in FIG. 2. For example in FIG. 2A, the case where the product of P and $T_B$ is greater than the product of A and $T_O$ is illustrated as the overlay coating 220 is peeled from the base coating 210, plugs 225 of overlay coating 220 remain within the micro-impressions 215. If the inverse relationship were true, then the undesirable situation presented in FIG. 2B would occur with an overlay coating 240 peeling from a base coating layer 230 and removing the micro-impressions containing pieces 233 of the base coating layer 230 to reveal an unprotected coating 235.

Figure 3:
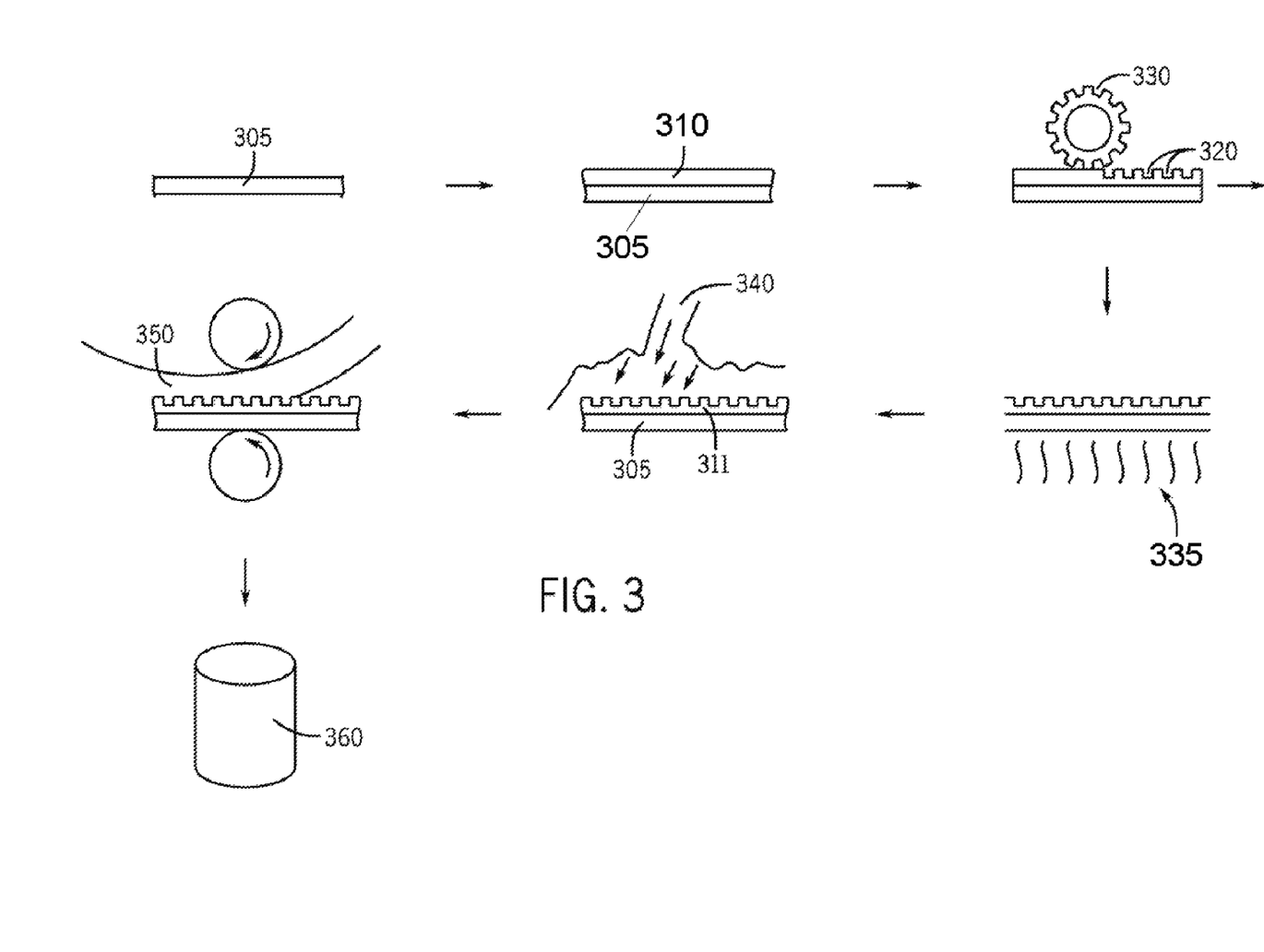
FIG. 3 is a schematic representation of the process of can coating using the micro-impression coating compositions, according to one embodiment..

According to another aspect, a process is provided for preparing a coating composition. In one embodiment, a base coating resin is applied to a substrate, the top surface of the base coating resin is optionally micro-impressioned, and an overlay coating resin is applied to the micro-impressioned top surface of the base coating resin. For example, see the schematic diagram of FIG. 3 where the formation of a coating can 360 according to various embodiments is formed. As described above, the base coating resin 310 may be an epoxy resin that is applied to a metal surface 305. The micro-impressions 320 may be applied by a variety of techniques, before or after curing of the resin. Such techniques include, but are not limited to, drilling each impression into the cured resin, using a press 330 to form the impressions either at ambient or elevated temperatures, using a form during the curing process 335, or using nano-imprint lithography, among others know to those of skill in the art. As used herein, "curing of the resin" refers to the setting of the resin as a coating that does not flow on the substrate at room temperature. After curing, the micro-impressioned base coating layer 311 is washed 340 to remove toxic substances that may be present in the base coating layer 311. An overlay coating layer 350 is then applied to fill in the micro-impressions on the micro-impressioned base coating layer 311. The coated can 360 may then be formed.

In some embodiments, the micro-impressions are formed using a press. A press having micro-impressions may be used to press the micro-impressions into the cured or curing resin on the substrate. The press may be a roller press for roll embossing or stamping. Under sufficient pressure, the cured, or curing, base coating resin may yield to form the micro-impressions. Heat may be applied to soften the cured base coating resin in such a process. Alternatively, a form, or mold, may be used having micro-protrusions such that as the base coating resin cures, it is molded to have a micro-impressioned surface. Alternatively, nano-imprint lithography and rollers may be used to form the micro-impressions. Such a technique can take advantage of nano-level asperities to enable an increase in surface area.

Figure 4A:
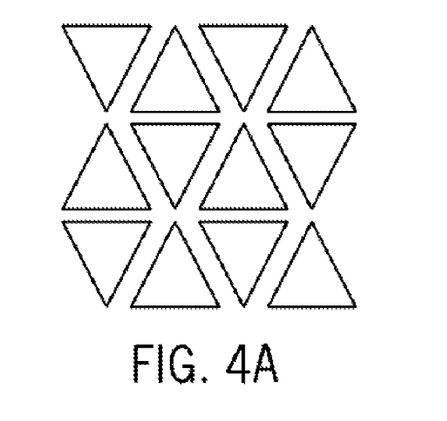
FIGS. 4A, 4B, and 4C are illustrations of micro-impression patterns of triangles, rectangles, and hexagons, respectively, according to various embodiments.
Figure 4B:
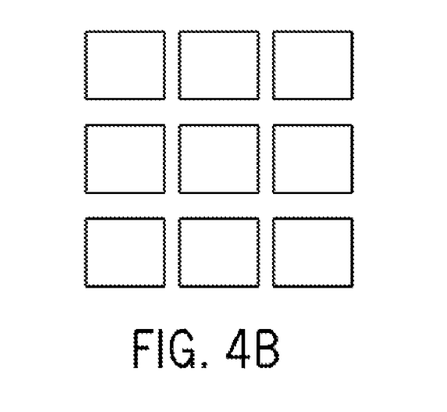
Figure 4C:
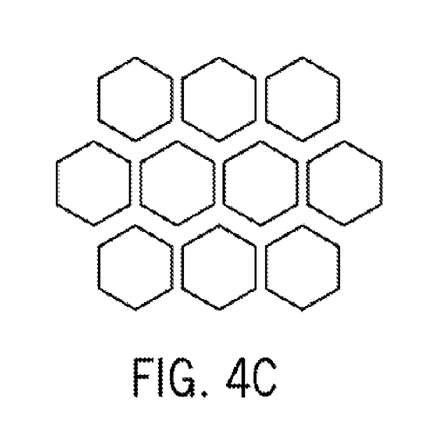
Figure 5:
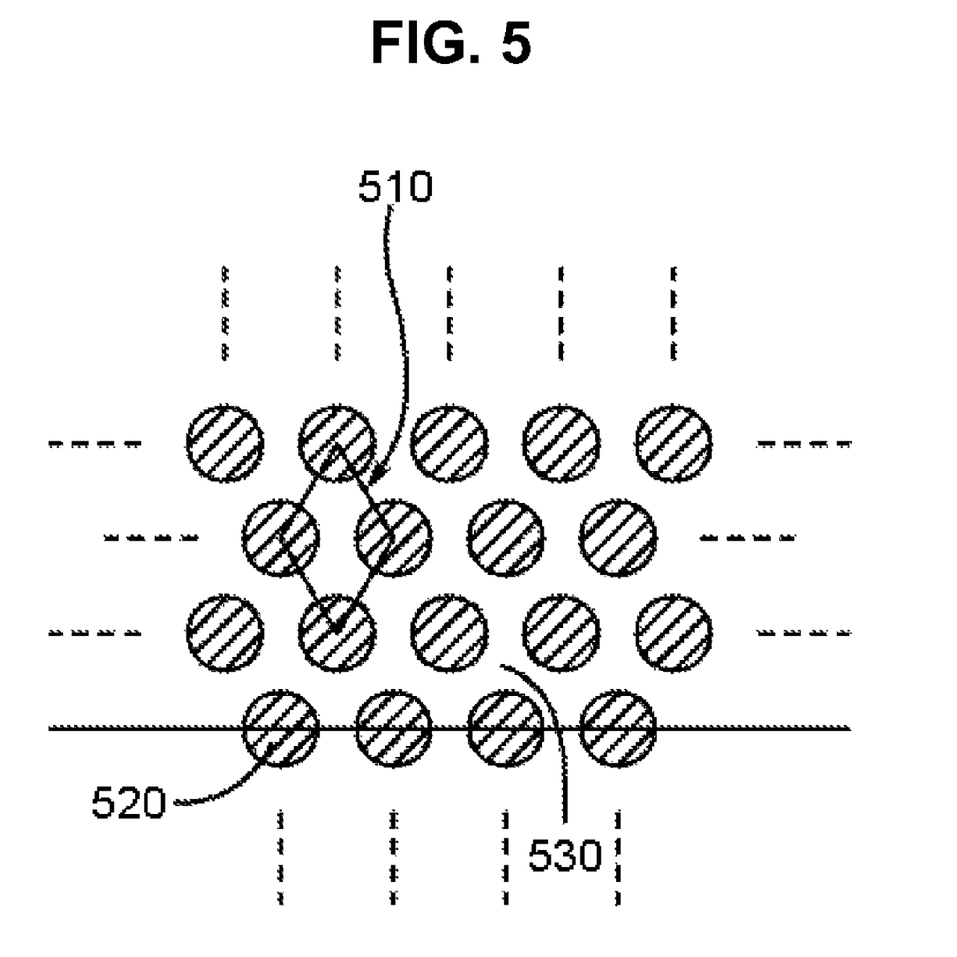
FIG. 5 is an illustration of the determination of a minimum repeating unit for determining micro-impression and planar surface areas, according to some embodiments.

According to various embodiments, the micro-impressions have a shape that is dependent upon the method used and the shape of the micro-protrusions of the press, roller, or stamp. For example, the shapes may be, but are not limited to, circular or polygonal shapes such as triangular, square, quadrangular, or hexagonal shapes, some of which are illustrated in FIG. 4. In some embodiments, such shapes may be provided in an array adhering to the $P*T_B>A*T_O$ relationship. According to other embodiments, such shapes may be provided in a dense array to minimize the area of the planar portion of the base coating resin, thus favoring adherence to the $P*T_B>A*T_O$ relationship. For example, in FIG. 5, the top drawing illustrates "minimum repeating unit" 510 to calculate the micro-impression area 520 (A mm$^2$) and the planar area 530 (P mm$^2$) easily. The minimum repeating unit may be determined by setting an arbitrary shape and a value of the surface area of the shape. In other examples, an appropriate shape on the surface repeating sequentially can be picked up and the surface area can be calculated. Then based on both the surface area and the tensile strength, the proportion of surface area of the porous area and the planar area can be calculated. In other embodiments, the micro-impressions may take the shape of lines, i.e. grooves, in the base coating resin. In some embodiments, the micro-impressions, or asperities, are hole-shaped.

Figure 6A:
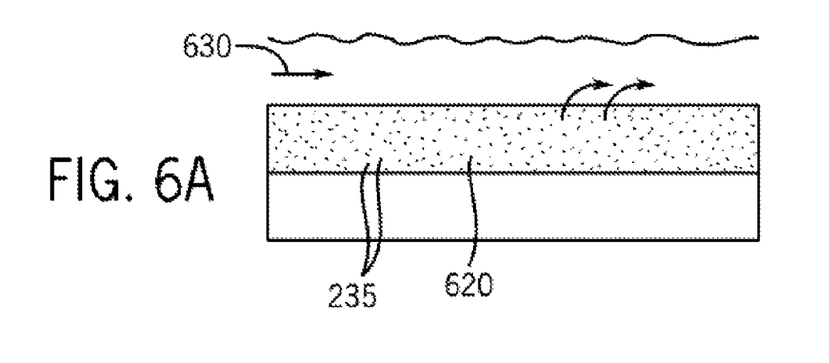
FIGS. 6A and B are illustrations of the cleaning of the surfaces with (FIG. 6A) and without (FIG. 6B) micro-impressions.
Figure 6B:
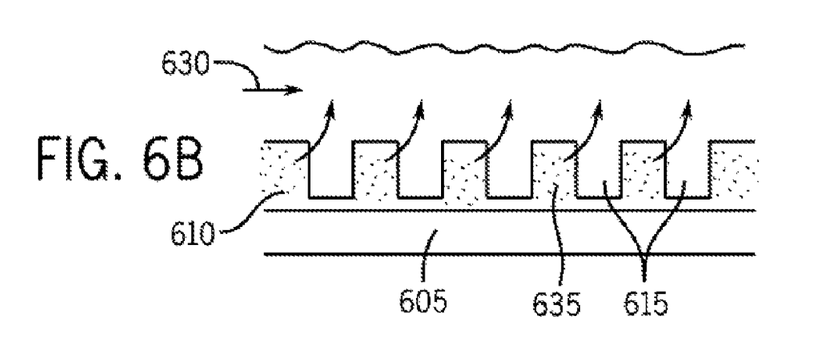

In some embodiments, prior to application of the overlay coating resin, the base coating resin is contacted with a solvent to extract unreacted or excess components from the base coating. In some embodiments, the unreacted or excess components are toxic. For example, where the base coating resin contains free BPA, the base coating, after curing, is subjected to extraction with an appropriate solvent. Appropriate solvents include those in which the BPA is readily soluble without affecting the integrity of the cured base coating resin as a whole, the adhesion of the base coating resin, and which is readily removed prior to application of the overlay coating resin. Such solvents include, but are not limited to, water, methanol, ethanol, propanol, acetone, acetonitrile, or a mixture of any two or more such solvents. Alternatively, the base coating resin may be cleaned, thus removing at least some unreacted, or free, BPA. Such cleaning may be conducted using ultrasonic cleaning techniques. As illustrated in FIG. 6, the micro-impressions 615 provide increased surface area in the base coating resin 610 on a metal substrate 605, as compared to a non-impressioned surface 620, such that cleaning, or washing 630, of toxins 635, such as BPA, from the base coating resin is better facilitated.

According to some embodiments of the process, a tensile strength of the base coating resin, $T_B$, is greater than a tensile strength of the overlay coating resin, $T_O$. According to other embodiments, the product of P and $T_B$ is greater than the product of A and $T_O$, where A is the area of the micro-impressions; and P is the area of the non-impressioned planar areas. In some embodiments, the base coating is an epoxy and the overlay coating is PET.

In some embodiments, the overlay coating resin is applied according to the methods commonly used in the art. For example, spin coating, draw coating, spraying, brushing, or other commonly used techniques may be used. In some embodiments, a film of the overlay coating resin is clad, or laminated, to the base coating resin using thermocompression bonding. In such bonding, the surface asperities of the base resin coating reduce the likelihood of peel-off, or de-lamination, of the overlay coating resin, during the can manufacturing processes. For example, the surface asperities reduce the likelihood of peel-off during pressing and deep drawing during can formation. Moreover, as described above, even if de-lamination of the overlay coating resin occurs, it is unlikely that the overlay coating resin that penetrates the micro-impression, will also peel off In other words, the micro-impressions remain filled, due to the relationship of A, $T_B$, P. and $T_O$. Due to the micro-impressions remaining filled, toxins in the base coating resin, such as BPA, are prevented, or hindered, from dissolving out.

According to various embodiments, the substrate used in the process of preparing the coating composition includes, but is not limited to, one or more of plastic, metal, or glass. In some embodiments, the substrate may be a plastic that include BPA, and in such cases the substrate and the base coating layer may be the same. In some embodiments, the substrate is a metal blank for the formation of a can. In other embodiments the process also includes forming the substrate into a can. Where the substrate is metal, the forming the substrate into a can may also include deep drawing of the metal into a can. Thus, in another aspect, a metal can coated with the coating composition(s) is provided.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

EQUIVALENTS

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A coated substrate comprising:
   a substrate,
   a base coating resin with micro-impressions and planar areas, and
   an overlay coating resin;
   wherein the coated substrate adheres to the formula:

$$P*T_B > A*T_O;$$

wherein:
   $T_B$, is a tensile strength of the base coating resin;
   $T_O$ is a tensile strength of the overlay coating resin;
   A is the area of the micro-impressions; and
   P is the area of the planar areas.

2. The coated substrate of claim 1, wherein $T_B$ is greater than $T_O$.

3. The coated substrate of claim 1, wherein the base coating resin comprises an epoxy resin.

4. The coated substrate of claim 3, wherein the epoxy resin comprises bis-phenol A epoxy resin.

5. The coated substrate of claim 1, wherein the overlay coating resin is a polypropylene resin, a polyethylene resin, a polyethylene terephthalate resin, a polyurethane resin, or a blend of any two or more resins thereof, or a copolymer of any two or more such resins.

6. The coated substrate of claim 5, wherein the overlay coating resin is a polyethylene terephthalate resin, or a blend thereof.

7. The coated substrate of claim 1, wherein the micro-impressions are filled with the overlay coating resin.

8. The coated substrate of claim 1, wherein the area of the micro-impressions is from about 0.001 $\mu M^2$ to about 1000 $\mu M^2$.

9. The coated substrate of claim 1, wherein $T_B$ is from about 50 MPa to about 100 MPa, from about 55 MPa to about 90 MPa, from about 60 MPa to about 85 MPa, from about 65 MPa to about 80 MPa, or from about 65 MPa to about 75 MPa.

10. The coated substrate of claim 9, wherein $T_B$ is from about 65 MPa to about 75 MPa.

11. The coated substrate of claim 1, wherein $T_O$ is from about 70 MPa to about 110 MPa, from about 75 MPa to about 105 MPa, from about 75 MPa to about 100 MPa, from about 80 MPa to about 95 MPa, or from about 80 MPa to about 90 MPa.

12. The coated substrate of claim 11, wherein $T_O$ is from about 80 MPa to about 90 MPa.

13. A process of preparing a coated substrate comprising:
applying a base coating to a substrate;
micro-impressioning a top surface of the base coating resin to provide a micro-impressioned top surface of the base coating comprising micro-impressions and non-impressioned planar areas; and
applying an overlay coating resin to the micro-impressioned top surface of the base coating;
wherein the coated substrate adheres to the formula:

$$P*T_B > A*T_O; \text{ wherein:}$$

A is the area of the micro-impressions;
P is the area of the non-impressioned planar areas;
$T_B$ is a tensile strength of the base coating resin; and
$T_O$ is a tensile strength of the overlay coating resin.

14. The process of claim 13 further comprising contacting the micro-impressioned top surface of the base coating with a solvent prior to applying the overlay coating resin, to extract unreacted or excess materials of the base coating.

15. The process of claim 14, wherein the unreacted or excess materials comprise bis-phenol A epoxy resin.

16. The process of claim 13 further comprising curing the base coating resin to form a cured based coating resin, wherein the micro-impressioning comprises boring holes into the top surface of the cured base coating resin.

17. The process of claim 13, wherein the micro-impressioning comprises rolling or stamping micro-impressions into the top surface of the base coating resin.

18. The process of claim 13 further comprising curing the base coating resin to form a cured based coating resin, and the micro-impressioning comprises applying a stamp comprising micro-protrusions to the cured or curing base coating resin.

19. The process of claim 13, wherein the substrate is a metal blank for the formation of a can.

20. The coated substrate of claim 1, wherein the substrate comprises a can.

* * * * *

UNITED STATES PATENT AND TRADEMARK OFFICE
CERTIFICATE OF CORRECTION

| | | |
|---|---|---|
| PATENT NO. | : 8,282,994 B2 | Page 1 of 1 |
| APPLICATION NO. | : 12/691462 | |
| DATED | : October 9, 2012 | |
| INVENTOR(S) | : Kusuura | |

It is certified that error appears in the above-identified patent and that said Letters Patent is hereby corrected as shown below:

On the Face Page, in Field (56), under "OTHER PUBLICATIONS", in Column 1, Line 13, delete "H.-J." and insert -- H. J. --, therefor.

On the Face Page, in Field (57), under "ABSTRACT", in Column 2, Line 6, delete "areas;" and insert -- area, --, therefor.

In Column 3, Line 56, delete "foodstuff" and insert -- foodstuff. --, therefor.

In Column 4, Line 53, delete "$300_I AM^2$," and insert -- $300 \mu M^2$, --, therefor.

In Column 7, Line 10, delete "off" and insert -- off. --, therefor.

In Column 7, Line 12, delete "P." and insert -- P, --, therefor.

In Column 8, Line 18, delete "thereof" and insert -- thereof. --, therefor.

In Column 8, Line 41, in Claim 1, delete "$T_B$," and insert -- $T_B$ --, therefor.

Signed and Sealed this
Eighth Day of January, 2013

David J. Kappos
*Director of the United States Patent and Trademark Office*